April 21, 1925.
W. E. FOWLER, JR
1,534,583
SECURING BRAKE BEAM SUPPORTS TO TRUCKS
Filed May 15, 1924   2 Sheets-Sheet 1
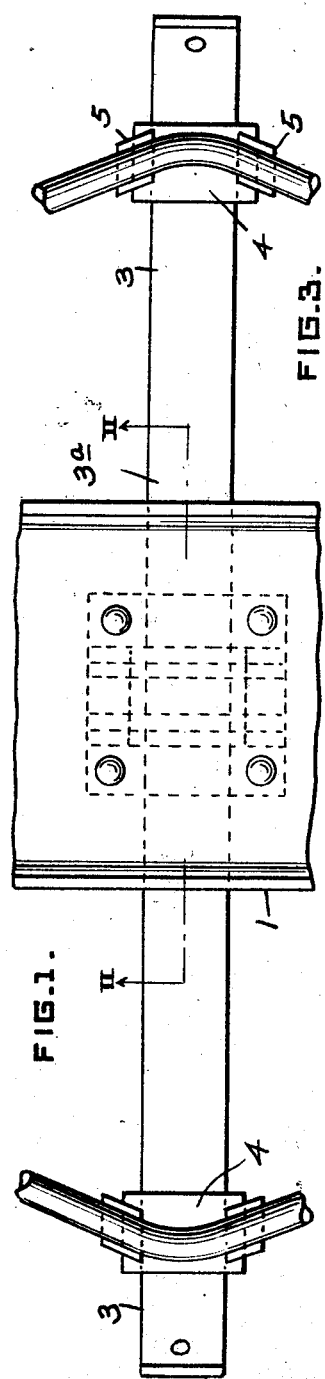
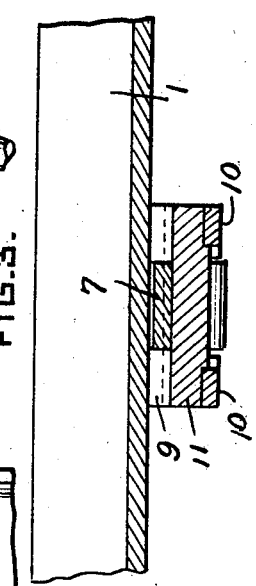
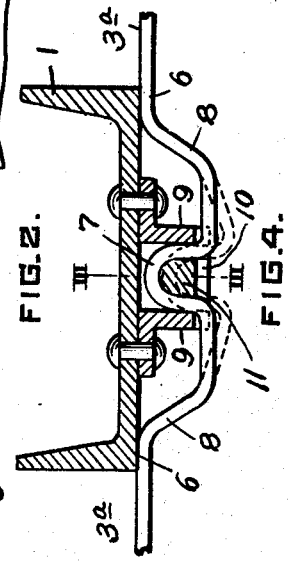
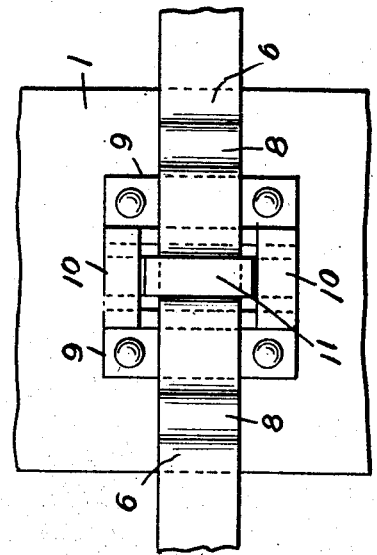
INVENTOR
William E. Fowler Jr
by Dannin S. Wolcott
atty
WITNESSES
J. Herbert Bradley.

April 21, 1925.  W. E. FOWLER, JR  1,534,583
SECURING BRAKE BEAM SUPPORTS TO TRUCKS
Filed May 15, 1924  2 Sheets-Sheet 2
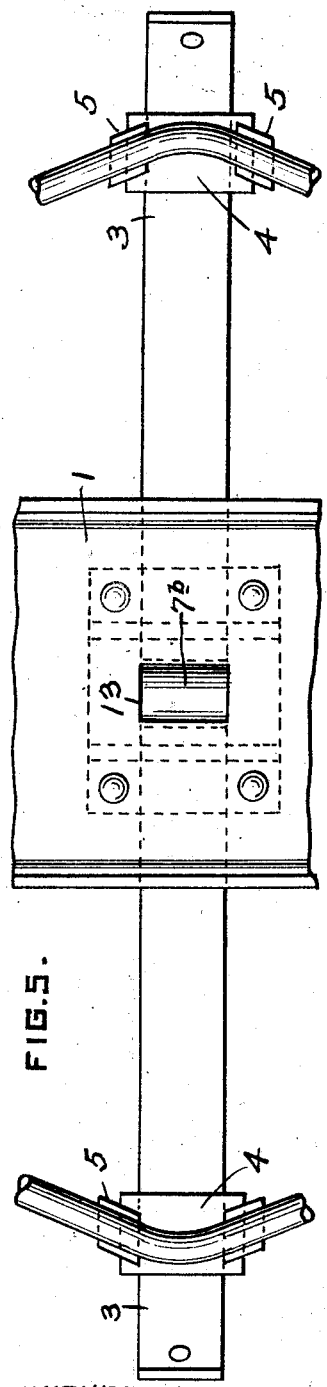
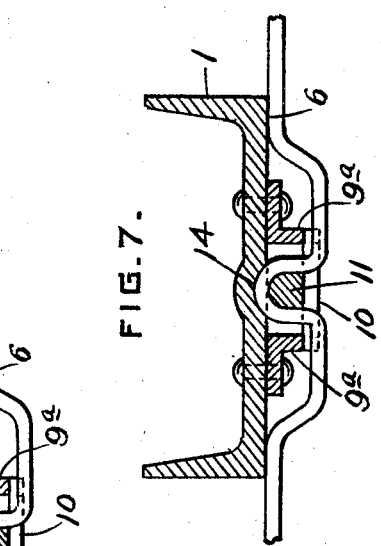
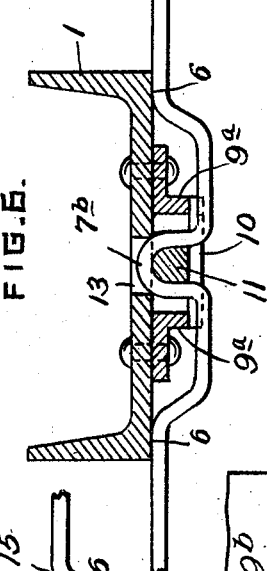
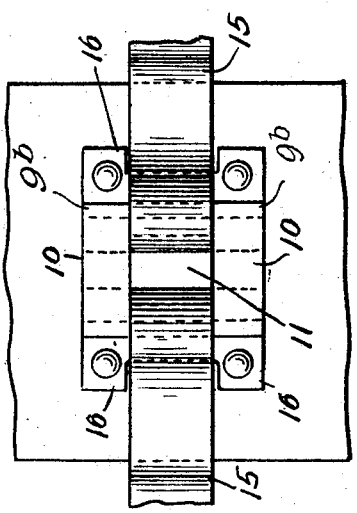
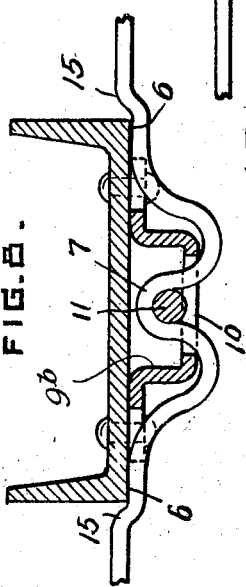
INVENTOR
William E. Fowler Jr
by Darwin S Wolcott
atty
WITNESSES Patented Apr. 21, 1925.

1,534,583

UNITED STATES PATENT OFFICE.

WILLIAM E. FOWLER, JR., OF MOUNT LEBANON, PENNSYLVANIA, ASSIGNOR TO DAVIS BRAKE BEAM COMPANY, OF JOHNSTOWN, PENNSYLVANIA, A CORPORATION OF PENNSYLVANIA.

SECURING BRAKE-BEAM SUPPORTS TO TRUCKS.

Application filed May 15, 1924. Serial No. 713,563.

*To all whom it may concern:*

Be it known that I, WILLIAM E. FOWLER, Jr., residing at Mount Lebanon, in the county of Allegheny and State of Pennsylvania, a citizen of the United States, have invented or discovered certain new and useful Improvements in Securing Brake-Beam Supports to Trucks, of which improvements the following is a specification.

In applications Serial Numbers 713,561 and 713,562 filed May 15, 1924, I have described and claimed certain improvements in the manner of attaching brake beam supporting rails to a truck element, as for example, the spring plank. While the constructions described and claimed in said applications may be employed in providing what is known as three-point supports, they are more particularly adapted for attaching rails to the spring plank when it is desired to adopt the four-point construction. The invention described herein relates especially to the manner of attaching the supporting rail to the spring plank in alinement with the strut of the brake beam. The invention is hereinafter more fully described and claimed.

In the accompanying drawings forming a part of this specification, Fig. 1 is a plan view showing portions of the spring plank and brake beam, also illustrating the manner of attaching the supporting rail to the spring plank; Fig. 2 is a sectional view on a plane indicated by the line II—II, Fig. 1; Fig. 3 is a sectional view on a plane indicated by the line III—III, Fig. 2; Fig. 4 is a plan view of the underside of the spring plank; Figs. 5 and 6 are views similar to Figs. 1 and 2, illustrating further modifications of the improvements claimed herein; and Fig. 7 is a sectional view illustrating a modification of the form shown in Fig. 6; and Fig. 8 is a sectional view; Fig. 9 is a plan view of a further modification of the constructions shown in Fig. 2.

In the three-point brake beam supporting system, the beam is supported at its ends by the usual hangers and the rail forming part of the third supporting means is arranged in line vertically with the strut of the brake beam. On account of the vertical relation of the brake beam and the spring plank to which it is preferred to attach the supporting rail, considerable difficulty is encountered in so attaching a rail having upwardly inclined end portions to the spring plank that such inclined portions will occupy proper positions below the strut. And further, on account of the close proximity of the spring plank to the bolster of the truck, access is difficult to the point where the rail should be attached to the spring plank, to insert the locking pin into the loop in the constructions shown and described in the applications referred to.

In the practice of the invention the supporting rail is constructed substantially similar to that shown in both applications above referred to, and is provided at its ends with inclined portions 3 on which are movably mounted blocks or shoes 4 slotted for the reception of the inclined portions 3 and also with grooves or seats 5 spaced such a distance apart as will permit the end of the strut to pass in between them and also oppositely inclined to engage the tension member on both sides of the strut, as clearly shown in Figs. 1 and 5. The portions of the rail 3ª extending inwardly from the inclined portions 3 are made straight and of such a length as to overlap for a short distance the underside of the spring plank 1, such overlapping portions 6 forming two points of bearing on the plank 1. The portions 8 extending inwardly from the seat 6, such portions being resilient, are bent downwardly out of contact with the underside of the spring plank, and integral with the inner ends of these inclined portions 8 is formed a loop 7 or U-shaped portion. To the underside of the spring plank are secured angle bars 9 having their lower edges connected together by transverse bars 10 preferably formed integral with the angle bars 9 and spaced apart a distance at least equal to the width of the supporting rail, as shown in Figs. 4 and 7. As will be seen by the dotted lines in Fig. 2 the parts 8 which are resilient are inclined downwardly at such an angle and the loop 7 which is integral with such parts 8, is made of such a height that when the bearings 6 bear on the underside of the spring plank, the loop 7 will project only a short distance into the box above described and hence pressure must be applied to force the loop up into the box to a position permitting of a pin 11 being passed above the cross pieces 10 and through the loop, as clearly shown in Fig. 2.

It is characteristic of this construction that as the box into which the loop projects, is on the underside of the spring plank, and access will be easily had to insert and remove the pin serving to attach the rail to the spring plank.

In the construction shown in Figs. 5 and 6, the flanges of the angle bars 9ª forming the sides of the box on the underside of the plank, are formed short vertically in order that the loop 7ᵇ, when secured in position by the pin 11, may project into an opening 13 in the spring plank so that in lieu of holding the rail from movement either by the sides of the box, as shown in Fig. 2, or by the pins, as shown in Figs. 5 and 6, the rail is held from movement by the engagement of a portion of the loop with the abutment formed by the sides of the opening 13 in the spring plank.

In lieu of forming an opening entirely through the spring plank, as shown in Fig. 6, a recess or pocket 14 may be formed in the underside of the spring plank for the reception of the ends of the loop 7ᵇ, the walls of the pocket forming abutments engaged by the loop to hold the rail from movement.

It will be observed that in this construction, although the third point of bearing of the rail on the spring plank is not directly on the plank, yet the downward pressure exerted by the resilience of the parts 8 is transferred to the plank through the pin and box.

In the construction shown in Figs. 8 and 9, the angle bars 9ᵇ are spaced such a distance apart relative to the width of the loop in the rails and of such a depth that the longitudinal movements of the rails will not be limited by contact of the loop with the downwardly projecting flanges of the angle bars nor by the engagement of the loop with the spring plank. Such movement being preferably limited by shoulders 15, so located on the supporting rails as to contact with or be closely adjacent to the sides of the spring plank. In order to prevent lateral movement of the supporting rails, the flanges 16 of the angle bars are slotted and made of such widths that portions of the rails will extend into the slots.

It is characteristic of the several constructions shown and described herein that the supporting rails are provided with shoulders which are adapted to engage some part of the spring plank or element carried thereby to prevent material longitudinal movement of the rails. In the constructions shown in Figs. 1, 2 and 3 the loops 7 form the shoulders which bear against the angle bars 9 to limit the longitudinal movement of the rails, while in Figs. 5, 6 and 7 the loop engages the spring plank direct. In the construction shown in Figs. 8 and 9 the loop is not utilized to limit the longitudinal movements of the rails but shoulders 15 are provided solely for that purpose. The function of the pin 11 is to support the rails and maintain the portions intermediate the bearings 6 under tension.

I claim herein as my invention:

1. The combination of a spring plank, a brake beam supporting rail provided with a loop intermediate its ends and having points spaced from the loop bearing resiliently on the plank, and means secured to the underside of the plank adapted to engage the loop.

2. The combination of a spring plank, a brake beam supporting rail provided with a loop intermediate its ends and having points spaced from the loop bearing resiliently on the plank and means secured to the underside of the plank adapted to engage the loop, the rails being provided with shoulders adapted when the rail is in operative position, to prevent longitudinal movement of the rail.

3. The combination of a spring plank, spaced bars secured to the underside of the spring plank, a supporting rail provided with a loop intermediate its ends and adapted to project between said bars and a pin passing through the loop and resting on the bars.

4. The combination of a spring plank, spaced bars secured to the underside of the spring plank, a supporting rail having points of bearing on the plank on opposite sides of the point of attachment of the bars to the plank and provided with a loop intermediate said points of bearing and adapted to project up between the spaced bars, the portions of the rail intermediate the loop and the points where the rail bears on the plank being resilient and spaced from the plank and a pin passing through the loop and resting on said bars.

5. The combination of a spring plank, a supporting rail adapted to bear on the underside of the plank adjacent to its edges and having resilient portions extending downwardly from the points of bearing of the rail on the plank and having a portion intermediate the inclined portions extending towards the plank and means for securing such intermediate portion to the underside of the plank.

6. The combination of a spring plank having abutments on its underside, spaced bars secured to the underside of the plank, a supporting rail provided with a loop intermediate its ends and adapted to project between said bars, and a pin passing through the loop and resting on the bars and holding the loop in engagement with the abutments on the plank.

7. The combination of a spring plank having abutments on its underside, spaced bars secured to the underside of the spring plank, a supporting rail having points of bearing on the plank on opposite sides of the point of attachment of the bars to the plank and provided with a loop intermediate said points of bearing and adapted to project up between the spaced bars, the portions of the rail intermediate the loop and the points where the rail bears on the plank being resilient and spaced from the plank and a pin passing through the loop and resting on said bars, and holding the loop in engagement with the abutments on the plank.

8. The combination of a spring plank, spaced bars secured to the underside of the spring plank, a supporting rail provided with a loop intermediate its ends, and adapted to project between the said bars, a pin passing through the loop and resting on the bars, and shoulders on the rails adapted to bear on opposite sides of the plank.

9. The combination of a spring plank, spaced bars secured to the underside of the plank, a supporting rail having points of bearing on the underside of the plank, on opposite sides of the point of attachment of the bars to the plank and provided with a loop intermediate of said points of bearing and adapted to project up between the spaced bars, the portions of the rails intermediate the loop and the points where the rails bear on the plank being resilient and spaced from the plank, a pin passing through the loop and resting on the bars, said rail being provided with shoulders adapted to bear on opposite sides of the spring plank.

In testimony whereof, I have hereunto set my hand.

WILLIAM E. FOWLER, Jr.